United States Patent [19]

Armida et al.

[11] Patent Number: 4,575,914
[45] Date of Patent: Mar. 18, 1986

[54] ASSEMBLY-PROCEDURE AND RELATIVE HINGE-ASSEMBLY FOR USE WITH LUBRICATED-TYPE CRAWLER TRACKS

[75] Inventors: Gennaro Armida, Milan; Decio Sacco, Naples; Walter Grilli, Castelnuovo Rangone, all of Italy

[73] Assignee: Italtractor I.T.M. S.p.A., Castelvetro, Italy

[21] Appl. No.: 510,665

[22] Filed: Jul. 5, 1983

[30] Foreign Application Priority Data

Aug. 5, 1982 [IT]  Italy .............................. 40081 A/82

[51] Int. Cl.[4] ........................ B23P 11/00; F16J 15/16; B62D 55/08; F16C 17/04
[52] U.S. Cl. ........................................ 29/434; 16/274; 29/525; 59/7; 277/92; 277/94; 277/95; 305/11; 305/14; 305/59; 384/243; 384/381; 384/420
[58] Field of Search ................. 16/274; 29/148.3, 434, 29/509, 525; 59/5, 7; 305/11, 12, 13, 14, 58 R, 58 PC, 59; 384/140, 152, 243, 380, 381, 398, 420; 474/202; 277/91, 92, 94, 95, 152, 228, 84

[56] References Cited

U.S. PATENT DOCUMENTS

| | | | |
|---|---|---|---|
| 3,390,922 | 7/1968 | Reinsma | 305/11 |
| 4,132,418 | 1/1979 | Roli | 305/11 X |
| 4,149,758 | 4/1979 | Livesay | 305/11 |
| 4,179,130 | 12/1979 | Fass et al. | 305/11 X |
| 4,204,716 | 5/1980 | Baylor | 277/92 X |
| 4,246,689 | 1/1981 | Deli | 29/148.3 X |
| 4,265,084 | 5/1981 | Livesay | 59/7 |
| 4,331,339 | 5/1982 | Reinsma | 305/11 X |
| 4,364,572 | 12/1982 | Yamamoto et al. | 305/11 X |
| 4,438,981 | 3/1984 | Harms | 305/14 |
| 4,469,336 | 9/1984 | Linne | 305/11 X |

Primary Examiner—Howard N. Goldberg
Assistant Examiner—Ronald S. Wallace
Attorney, Agent, or Firm—Browdy and Neimark

[57] ABSTRACT

The hinge-assembly to which the invention relates has a sleeve (3) located about the central section of a hinge-pin (2), and two thrust-rings (7) associated as one with the pin itself and abutting the ends (33) of the sleeve, the rings themselves housing respective seals (10). These seals (10), together with the rings (7) prevent any outflow of lubricant from the interspace between the breasted surfaces of pin (2) and sleeve (3). The assembly-procedure when uniting said hinge-assembly to the track-links involves preparation and prior lubrication of the hinge itself, followed by a pause of sufficient duration in which to check for any leaks, after which—and only after which—the links are fitted up to the pre-assembled hinge.

7 Claims, 6 Drawing Figures

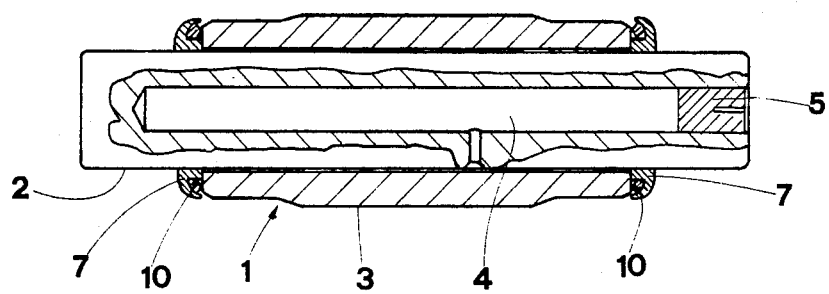
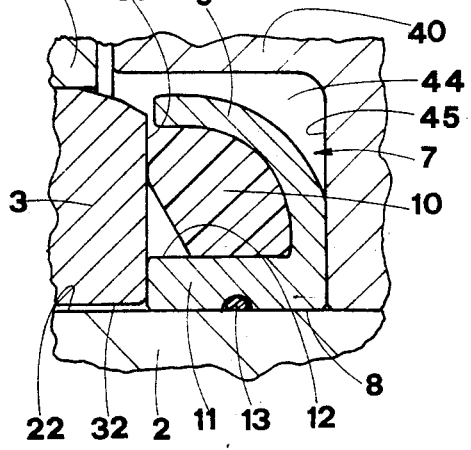
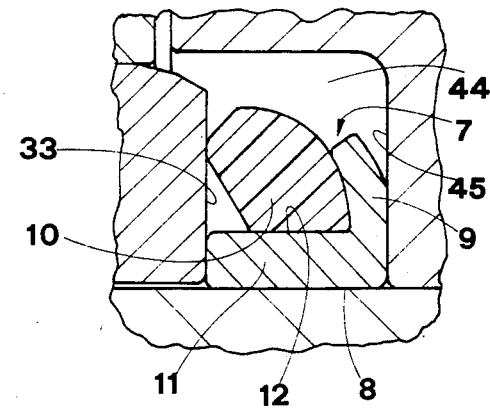
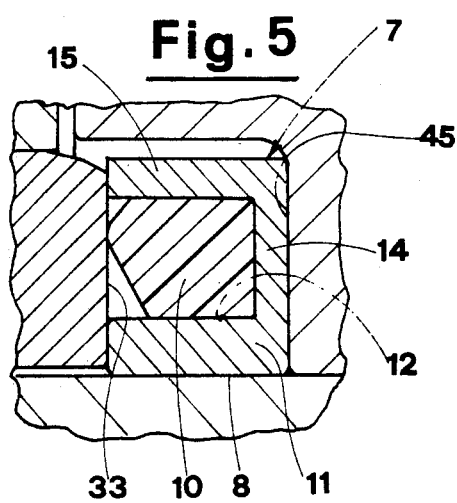
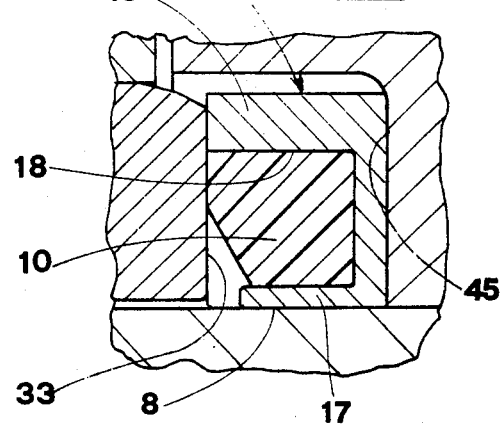

ASSEMBLY-PROCEDURE AND RELATIVE HINGE-ASSEMBLY FOR USE WITH LUBRICATED-TYPE CRAWLER TRACKS

BACKGROUND OF THE INVENTION

The invention described herein relates to an assembly-procedure for crawler-tracks utilizing lubricated link-pivots, and to the hinge-assembly created therefor.

Crawler-tracks comprising a number of interconnected right and left and links are by now well known. These links are joined by a hinge-assembly basically consisting of a pivot, or pin, and bushings which rotate around said pin—briefly, each link has two holes: one receiving the pin, and one receiving the bushing, these being forced onto the ends of the pin forming part of one hinge-assembly, and of the bushing of another hinge-assembly, respectively. In the first such pairing the link is an outer-link (or outer link-portion), and in the second, an inner link (or inner link-portion). Every crawler track comprises a plurality of such hinge-assemblies disposed in succession and joined together by the links—these being fixed immovably to said hinge-assemblies.

Thus, each set of links basically comprises: a pin, two outer links forced onto the ends of same, a bushing, or sleeve turning coaxially with the pin and occupying its central stretch, and two inner links similarly forced onto the sleeve; a tread then fitted to each composite link is made fast either to the inner or outer pair thus constituted. In this way, one has a situation where each link is connected to two successive assemblies, functioning as inner portion for the one, and as outer portion for the next.

One present-day type of crawler track makes provision for the breasted surfaces of pin and sleeve to be lubricated with oil during operation, with the basic purpose in view of prolonging the track's service life, lowering noise-levels, and increasing efficiency. In order to bring such lubrication about, normal tracks of the type have an oil reservoir located inside the hinge-pin itself which feeds to the breasted surfaces aforesaid by way of one or more radially disposed holes. To prevent leakage and subsequent loss of the lubricant, one has seals located in recesses of annular shape let into the inner surfaces of the outermost links and disposed coaxially with the pin-hole in same; these seals being compressed axially to a given pre-load value, between the annular recess and the butt-end of the sleeve, guaranteeing thus tha no lubricant may leak out from that particular area. In addition, there can be no leakage-out of the lubricant along the pin-ends since these are force-fitted to the outer links. With this arrangement, the oil is obliged to remain where it is in fact supposed to remain—i.e. in the laminar interspace existing between the breasted surfaces of pin and sleeve, as aforedescribed.

A further feature often incorporated into these tracks is that of thrust-rings positioned together with the seals aforementioned in said annular receses, lodged between the outer link and the sleeve butt-end, whose purpose is that of inhibiting axial slide between pin and sleeve, as far at is mechanically possible.

Normally speaking, production-line assembly of lubricated crawler track links involves a series of separate and successive cycles which comprise the following stages:

a preparation of the hinge-assembly by introduction of the pin into its sleeve, and fitting of thrust ring to the pin adjacent to the sleeve butt-ends;

a' location by hand of the oil seals, either in the outer-link recesses or over the pin-ends;

b force-fitting of a pair of inner links over the sleeve-ends, exerting said force from the outsides of the hinge-assembly toward the centre, parallel with the pin-axis;

c force-fitting of a pair of outer links over those pin-ends protruding beyond said sleeve-ends, exerting said force from the outsides of the hinge-assembly toward the centre and parallel with the pin-axis;

d checking for a tight seal such as to render the interspace between said breasted pin and sleeve surfaces totally hermetic;

e injection of oil into the reservoir offered by the hinge-pin.

In effect, stages b and c are carried through by machine—since force-fitting of the links onto the hinge-assembly calls for enormous mechanical pressure—and it will normally be the case that the outer links of one hinge-assembly are pin-ended simultaneously with the inner links of the next hinge in line, which by definition will be sleeve-ended. Stages d and e are carried out on already-assembled composite links a little further down the the same line whilst further links continue to be assembled via stages b and c.

This procedure has a serious disadvantage: i.e. should it be discovered during the stage d that a less-than adequate seal is being provided for one reason or another (poor fitting, or defective material), than the entire plant must be shut down, halting assembly, and dismantling the links one by one from their hinge-assemblies until the initial defect is discovered; which also signifies rejection of a good number of individual components—pins, links, etc.—which may suffer damage when being taken apart. Clearly, considerable losses are involved here, whether of time, energy, or materials.

A worse disadvantage yet in relation to the same defect, is that of an oil-leak being discovered after the track has been fully assembled—in which case the track must be laid out on appropriate plant providing for its disassembly from one end link by link until the defective area is arrived at. It is worth adding at this point, that if the track has been rolled, the defective hinge-assembly will be difficult to locate in the first instance. The loss of time and materials in this case is even greater—moreover, a crawler track presents the handling problem of dead weight, perhaps hundreds of pounds, often over a thousand.

A further drawback stems from the fact that both sleeve and thrust rings are free to slide with respect to the hinge-pin, and must therefore be fitted up a short a time as possible before full assembly of the track. In most instances, such parts are warehoused separately, and covered with a thin film of oil so as to prevent rusting (particularly important in the case of the mating surfaces of pin and sleeve). Thus one has an added inconvenience in that individual hinge components must be treated before going into stock, and then cleaned once again before being used so as to remove both the oil, and dust which will have clung thereto in the meantime—the same applying for the links.

A further drawback arises from the fact that the thrust rings are not force-fitted to crawler track hinge-pins, meaning that oil-seal at the pin end is provided by the latter's pairing with its outer links. This calls for faultless machining both of the pin ends and of the links' pin hole surfaces, with no marks or ridges, if an efficient oil-seal is to be obtained.

The main object of the invention described herein is that of eliminating the disadvantages and drawbacks aforedescribed, most especially those concerned with the discovery of oil-leaks, whether during assembly or following completion of the assembled track.

A further object of the invention is that of providing a hinge-assembly suitable for warehousing in its assembled state, ready-lubricated, and capable of affording its own protection against rust and dirt to the mating surfaces aforesaid.

Another object of the invention is that of avoiding the necessity for an oil-seal afforded by the outer-link-and-pin pairing, thus reducing the amount of precision required in machining such parts, and dispensing with irrational cleaning of both links and hinge-assemblies immediately prior to their being joined together.

Yet another object of the invention is that of setting forth a hinge-assembly easily put together utilizing a small, simple, and perhaps automatically-operated press.

Another object of the invention is that of making for easy introduction of the lubricant into the hinge-pin, since this in fact takes place prior to assembly of the track, making the process simpler.

Another object of the invention is that of permitting a surer discovery of possible oil-leaks from the track's hinge-assemblies.

Another object of the invention is one of offering a hinge-assembly with spare-part usefulness, capable of being fitted to an existing track, and requiring no complicated or costly lubricant-injection equipment.

Another object of the invention is that of creating a hinge-assembly suitable for pairing with the links of non-lubricated tracks, whether new or already used.

SUMMARY OF THE INVENTION

These and other advantages are provided by the invention described herein, which envisages a hinge-assembly comprising:
- a hinge-pin whose ends are force-fitted into respective hoels offered by two links;
- a sleeve disposed coaxially with and about the central section of said pin, whose ends are force-fitted into holes offered by two further links;
- two thrust-rings associated coaxially and as one with said pin adjacent to the butt-ends of said sleeve, and offering housings to said sleeve butt-ends;
- sealing means located in said housings, designed to prevent egress of lubricant at said sleeve butt-ends;

said thrust rings being associated with the hinge-pin in such a way as to create a seal at their respective paired surfaces whilst at the same time maintaining a fit between ring and pin such as will exert pressure on the respective sealing means commensurate with the latter's ability to prevent the aforesaid egress of lubricant.

The assembly-procedure set forth by the invention described herein comprises the following stages, in sequence:
a preparation of said hinge-assembly, composed of said pin, said sleeve, said thrust-rings, and said sealing means;
b filling of the hinge-pin reservoir with lubricant;
c a pause of sufficient duration to establish possible oil-leaks from the assembled and lubricated hinge-assembly;
d force-fitting of two inner link bosses to the ends of said sleeve, said force exerted from the outsides of said hinge-assembly and directed toward the center of same parallel with the pin-axis;
e force-fitting of two outer link bosses to the ends of said pin, said force exerted likewise from the outsides of said hinge-assembly and directed toward the center, parallel with the pin-axis.

BRIEF DESCRIPTION OF THE DRAWINGS

Further features and advantages of the invention will emerge more clearly from the detailed description of the hinge-assembly which follows, illustrated by way of example, unlimitatively, and with reference to the accompanying drawings, in which:

FIG. 2 is a section through the longitudinal axis of the hinge-assembly described herein, seen in isolation, and on smaller scale;

FIG. 3 is a detail of FIG. 1 reproduced in larger scale so as to illustrate the thrust-ring (7);

FIGS. 4, 5 and 6 are similar representations to that seen in FIG. 3, showing the same thrust-ring in a variety of embodiments.

DESCRIPTION OF THE PREFERRED EMBODIMENT/S

Figure 1:
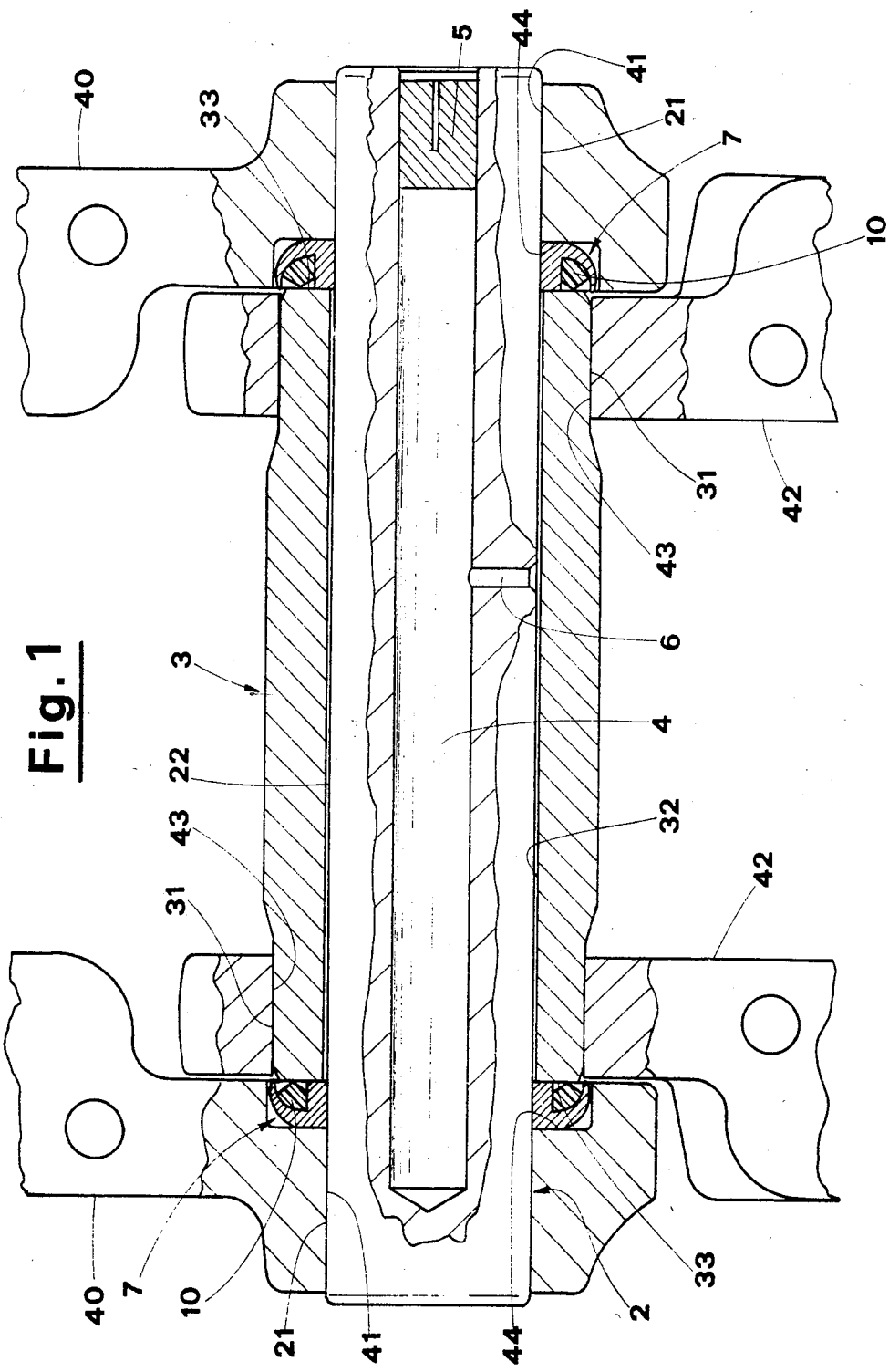
FIG. 1 is a longitudinal section through the hinge-assembly to which the invention relates, seen fitted to two pairs of track-links.

With reference to FIGS. 1, 2 and 3, the entire hinge-assembly subject of the invention is denoted 1.

The hinge-assembly comprises the following components:
- a hinge-pin 2 having a smooth cylindrical outer surface 22, whose two ends 21 are designed for force-fitting to the holes 41 offered by corresponding outer link bosses 40; provision made within said pin 2 for an axial cavity 4 serving as reservoir for lubricating oil, and closed off by a plug 5;
- a sleeve 3 disposed coaxially about the central section of said pin 2 and having a smooth inner cylindrical surface 32 designed to pair in rotation with said pin surface 22 and thus turn on its own axis, said breasted surfaces offered by pin and sleeve one to the other being lubricated by oil coming from reservoir 4 aforesaid by way of one or more radial ducts 6; the two ends 31 of said sleeve 3 designed for force-fitting to the holes 43 offered by corresponding inner link bosses 42. The bosses denoted 40 belong to one pair of links, whilst those denoted 42 belong to a further pair, signifying that four single links ultimately become associated with the hinge-assembly 1.
- two thrust rings 7, each having a cylindrical inner surface 8 which is smooth, and designed for force-fitting to the surface 22 of hinge-pin 2 at a point adjacent to the butt-end 33 of said sleeve 3; each single ring 7 having an annular protrusion 9 such as creates a housing directed toward said butt-end 33; the force-fit between the surface 8 of ring 7 and the surface 22 of hinge-pin 2 being such as to create a seal capable of preventing egress of the lubricant between said surfaces 8 and 22; provision being made further for an annular recess 44 in each outer boss 40, disposed coaxially with respect to the holes 41 located therein, and let into the inward-facing surface thereof, which encases said thrust ring 7 without making contact therewith;

two sealing means 10 located coaxially with and about said hinge-pin 2 and seated in the respective housings offered by thrust rings 7; the force-fit between thrust ring 7 and pin 2 being such as to render said ring 7 sufficiently immovable on the hinge-pin that when thrust toward said sleeve 3, it will be capable of maintaining said sealing means 10 sufficiently compressed between it 7 and said sleeve butt-end 33 to prevent egress of the lubricant therebetween.

The assembly-procedure envisaged for track-links, utilizing the hinge-assembly thus described 1, involves the following stages, carried out in the sequence as listed:

a preparation of the hinge-assembly described above, that is: insertion of hinge-pin 2 into the sleeve 3 and force-fitting of the thrust-rings 7 to the pin-ends, complete with their respective sealing-means 10 located, by pushing-in toward the butt-ends 33 of sleeve 3 such that said seals 10 are pre-loaded and remain compressed between said rings 7 and said butt-ends 33—this in order to ensure a perfect seal for the interspace defined by the breasted surfaces 22 and 32 of hinge-pin 2 and sleeve 3, respectively, bounded at either end by the thrust-rings 7 force-fitted to the pin itself 2, and by the seals associated therewith (FIG. 2 shows the hinge-assembly as put together by stage a);

b filling of the reservoir 4 in the hinge-pin itself with lubricant, which will then find its way to said breasted surfaces 22 and 32 via duct 6;

c a pause of sufficient duration to establish whether there be any oil-leak from the assembled hinge 1;

d force-fitting of link bosses 42 to the ends 31 of sleeve 3, this by pressure exerted from the outsides of the hinge toward the center and directed parallel with the pin-axis;

e force-fitting of further link bosses 40 to the ends 21 of pin 2, likewise by pressure exerted from the outsides of the hinge and directed parallel with the pin-axis toward the center.

Stage a of the above procedure may be carried out utilizing a machine of relatively small dimensions, since the force required in pushing said thrust-rings 7 onto the pin-ends 211 is not excessive. Stages d and e can be brought about with conventional machinery, it being feasible still to force-fit the outer link bosses of a pair to the hinge-pin on one assembly at the same time as the inner bosses of same are forced onto the sleeve of the next hinge-assembly in line (upstream, that is).

The advantages offered by the invention described herein now become evident.

The hinge-assembly is paired up with its links only after it has been established that no risk of leakage exists. In this way, one by-passes all of the drawbacks and inconveniences mentioned in the 'background' which arise out of the necessity for subsequent disassembly of the track and/or of its component parts, which the prior art has been unable thus far to avoid. In addition, one is able not only to single out any eventual leaks with ease, but also to avoid the loss of components otherwise dismantled to no good end.

Furthermore, lubrication itself is carried out on the individual hinge-assembly, which is more easily handled than a complete crawler track, with obvious advantages. What is more, ready-assembled and lubricated hinges can be warehoused directly following their exit from the assembly line, their most important and damageable surfaces—i.e. those paired in rotation, 22 and 32—duly protected and lubricated.

Also, the fact that the lubricant seal is provided by thrust-rings 7 makes for a less exacting machining-requirement where the outer link boss hinge-pin hole is concerned.

The hinge-assembly described herein, put together and lubricated, can be united with links used in non-lubricated crawler-tracks, whether new or used, since the pin 2 and sleeve 3 retain the same measurements as components utilized in such tracks, insofar as fitting-up is concerned. Thus, one has the possibility of regenerating a crawler track in which the hinges are worn, by reutilizing the links with lubricated hinge-assemblies as set forth herein. This process requires no special means where lubrication is concerned, since hinge-assemblies of this prepared and lubricated type will be commercially available to the technician carrying out the overhaul—this in itself being a positive factor from the point of view of spare parts availabity when changing single hinge-assemblies.

Turning now to the thrust-ring 7, the embodiment illustrated in FIG. 3 comprises an annular portion 11—this being the actual thrust-bearing component—of thickness less than that of the sleeve 3, whose one side makes contact with the innermost part (radially speaking) of the sleeve butt-end 33, and whose remaining side makes contact with the innermost radial area 45 of the inward-facing surface of link-boss 40. It is this portion 11 which inhibits axial movement between pin and sleeve during operation. Departing from the axially outermost point of the outer surface 12 of portion 11, one has a thin annular protrusion 9 whose outermost extremity arrives all-but-in-contact with the radially outermost edge of said butt-end 33 offered by sleeve 3, this being a protective medium serving to disallow the entry of dirt, grit and other foreign bodies into the enclosure containing seal 10. Protrusion 9 in fact creates a housing offered to the intermediate radial area of said butt-end 33, the seal itself lodged therein, and urging thereagainst, respectively. Further enhancement of the seal created between surface 8 of ring 7 and surface 22 of hinge-pin 2 can be afforded by a seal 13 seated in an annular undercut offered by thrust ring 7 itself, and urged against said surface 22.

The thrust-ring 7 as per the embodiment in FIG. 4 differs from that in FIG. 3 inasmuch as its annular protrusion 9 is shorter, and therefore affords no protection to the sealing means 10.

The thrust ring illustrated in FIG. 5 also has a thrust-bearing portion 11 comparable to that in FIG. 3, though in this case the annular protrusion 14 departs from a point further out, axially, on the external surface 12 of portion 11, and the external radial area of said protrusion 14 develops into a second annular portion 15 set at distance radially from said portion 11, which might also fulfill a thrust-bearing role, being in contact on the one hand with the external radial edge of butt-end 33, and on the other, with inward-facing surface 45 aforesaid offered by link-boss 40; the housing thus created between annular portions 11 and 15 duly giving onto the intermediate radial area aforesaid of butt-end 33.

The embodiment of the thrust ring 7 illustrated in FIG. 6 has its thrust-bearing annular portion 16, also noticeably thinner than the sleeve, in contact on the one side with the outermost radial edge of said sleeve butt-end 33, and on the other, with the inward-facing surface 45 of said link-boss 40. Departing from the axially outermost point of the inner surface 18 of said portion 16, one has an annular protrusion 17 whose inner surface 8 will be force-fitted to the hinge-pin 2, protrusion 17 thus creating the housing offered to said sleeve butt-end 33 at its intermediate radial area.

It will be clear that the embodiments illustrated in FIGS. 4 and 5 could also incorporate the further seal 13 designed to enhance retention of the lubricant, as in the embodiment in FIG. 3.

Numerous modifications of a practical nature may be made to constructional details of the invention described herein, without by any means straying from within the bounds of protection afforded thereto by the claims appended.

What is claimed:

1. Hinge-assembly for uniting the links of lubricated crawler tracks, characterized in that it comprises:
   - a hinge-pin (2), having a smooth cylindrical surface (22), whose two ends (21) are designed for force-fitting into the holes (41) offered by outer respective link bosses;
   - a sleeve (3) disposed coaxially with and about the central section of said pin (2) and provided with a smooth inner cylindrical surface (32), able thus to rotate with respect to the cylindrical surface (22) of said pin; the breasted surfaces of said pin (2) and said sleeve (3) lubricated by oil from a reservoir located permanently in said hinge-assembly; the two ends (31) of said sleeve (3) designed for force-fitting into the holes (43) offered by inner respective link bosses;
   - two thrust-rings (7), each of which provided with a smooth inner cylindrical surface (8) and associated coaxially and as one by the latter (8) with surface (22) aforesaid of said pin (2) adjacent to the butt-ends (33) offered by said sleeve (3); each ring (7) furnished with an annular protrusion such as creates a housing directed toward said butt-end (33) of said sleeve (3) and designed to accommodate sealing-means (10); the pairing between ring (7) and pin (2) being such as to prevent the egress of lubricant by way of their respective mating surfaces (8) and (22); the outer link bosses aforesaid each provided with an annular recess designed to receive said thrust-ring (7) whilst making no contact therewith;
   - sealing-means (10) located coaxially about said hinge-pin (2) and accommodated within the housings created by said annular protrusions/thrust-rings (7), for the purpose of retaining lubricant at the butt-ends (33) of said sleeve (3); the pairing aforementioned between ring (7) and pin (2) also being such as to compress said sealing means (10) to a sufficient degree of pre-loading against the butt-ends (33) of said sleeve (3), thereby checking any egress of lubricant.

2. Method for assembling lubricated crawler track links utilizing the hinge-assembly as claimed in claim 1, comprising, in sequence, the steps of:
   a providing said hinge-assembly, including said pin (2), said sleeve (3), said two thrust-rings (7), and said sealing-means (10):
   b filling the hinge-pin reservoir with lubricant;
   c pausing a sufficient duration to check for oil-leaks from the assembled and lubricated hinge;
   d force-fitting the two inner link bosses to the ends (31) of said sleeve (3), by exerting said force from the outsides of said hinge-assembly in a direction toward the centre of same parallel with the pin-axis;
   e force-fitting the two outer link bosses to the ends (21) of said pin (2), by exerting said force likewise from the outsides of said hinge-assembly in a direction toward the center of same, parallel with the pin-axis.

3. Hinge-assembly as in claim 1, characterized in that said thrust-ring (7) comprises:
   - an annular portion (11) fulfilling the thrust-bearing role, associated directly with said pin (2) and considerably less thick than said sleeve (3); said portion (11) making contact on the one hand with the innermost radial area of the butt-end (33) of said sleeve (3), and on the other, with the radially innermost area of the inward-facing surface (45) of said outer link boss;
   - an annular protrusion (9) departing from the outermost axial point of the cylindrical outer surface (12) of said portion (11), whose outermost extremity arrives all but in contact with the outer radial edge of the butt-end (33) offered by said sleeve (3); said protrusion (9) creating a housing offered to the intermediate radial area of the butt-end (33) of said sleeve.

4. Hinge-assembly as in claim 1, characterized in that said thrust-ring comprises:
   - an annular portion (11) fulfilling the thrust-bearing role, associated directly with said pin (2), and considerably less thick than said sleeve (3); said portion making contact on the one hand with the innermost radial area of the butt-end (33) of said sleeve (3), and on the other, with the radially innermost area of the inward-facing surface (45) of said outer link boss;
   - an annular protrusion (14) departing from the outermost axial point of the cylindrical outer surface (12) of said portion (11), whose farthest radial extremity develops into a second annular portion (15) set apart from said portion (11) and likewise fulfilling a thrust-bearing role, being in contact on the one hand with the external radial edge of the butt-end (33) offered by said sleeve (3), and on the other, with the inward-facing surface (45) of said outer link boss; the housing created between said annular portions (11) and (15) giving onto the intermediate radial area of the butt-end (33) offered by said sleeve (3).

5. Hinge-assembly as in claim 1, characterized in that each thrust-ring (7) comprises:
   - an annular portion (16) considerably less thick than said sleeve (3) fulfilling the thrust-bearing role, in contact on the one hand with the outermost radial edge of the butt-end (33) offered by said sleeve (3), and on the other, with the inward-facing surface (45) of said outer link boss;
   - an annular protrusion (17) departing from the outermost axial point of the inner cylindrical surface (18) of said portion (16) and provided with a smooth inner cylindrical surface (8) designed for force-fitting onto said hinge-pin (2); said protrusion (17) creating a housing directed toward the intermediate radial area of the butt-end (33) offered by said sleeve (3).

6. Hinge-assembly as in claim 1, characterized in that said thrust-ring (7) is force-fitted onto said hinge-pin (2).

7. Hinge-assembly as in claim 1, characterized in that it comprises a seal (13) located in an anular undercut offered by the inner surface (8) of said thrust-ring (7), and compressed thereby against the outer cylindrical surface (22) of the hinge-pin (2).

* * * * *